United States Patent [19]

Larose et al.

[11] Patent Number: 6,108,420
[45] Date of Patent: Aug. 22, 2000

[54] METHOD AND SYSTEM FOR NETWORKED INSTALLATION OF UNIQUELY CUSTOMIZED, AUTHENTICABLE, AND TRACEABLE SOFTWARE APPLICATION

[75] Inventors: Gordon Edward Larose; David Ian Allan, both of Ottawa, Canada

[73] Assignee: Channelware Inc., Nepean, Canada

[21] Appl. No.: 08/831,696

[22] Filed: Apr. 10, 1997

[51] Int. Cl.[7] .................................. H04L 9/00; H04L 9/30
[52] U.S. Cl. ...................................... 380/4; 380/9; 380/23; 380/25; 380/30; 380/49; 395/186; 395/187.01
[58] Field of Search .............................. 395/186, 187.01; 705/26, 27; 380/4, 9, 23, 25, 29, 30, 49, 50, 54, 59; 340/825.31, 825.34

[56] References Cited

U.S. PATENT DOCUMENTS

| | | | |
|---|---|---|---|
| 5,103,476 | 4/1992 | Waite et al. | 380/4 |
| 5,222,134 | 6/1993 | Waite et al. | 380/4 |
| 5,341,429 | 8/1994 | Stringer et al. | 380/23 |
| 5,416,840 | 5/1995 | Cane et al. | 380/4 |
| 5,493,649 | 2/1996 | Slivka et al. | 395/185.01 |
| 5,509,070 | 4/1996 | Schull | 380/4 |
| 5,509,074 | 4/1996 | Choudhury et al. | 380/23 |
| 5,530,752 | 6/1996 | Rubin | 380/4 |
| 5,553,143 | 9/1996 | Ross et al. | 380/25 |
| 5,559,884 | 9/1996 | Davidson et al. | 380/4 |
| 5,586,186 | 12/1996 | Yuval et al. | 380/30 |
| 5,586,304 | 12/1996 | Stupek, Jr. et al. | 395/712 |
| 5,724,425 | 3/1998 | Chang et al. | 380/25 |
| 5,825,877 | 10/1998 | Dan et al. | 380/4 |

FOREIGN PATENT DOCUMENTS 0686906   5/1995   European Pat. Off. ........ G06F 1/100
0717337  11/1995   European Pat. Off. ........ G06F 1/100

OTHER PUBLICATIONS

"Electronic Software Distribution Policies", Internet Special Interest Group, Software Publishers Association, Oct. 7, 1996; pp. 1 to 24.

Bruce Schneier, Applied Cryptography, Second Edition, 1996; chapter 2, pp. 21 to 46, chapter 3, pp. 47 to 74 and chapter 18, pp. 429 to 459.

Ziplock White Paper, Portland Software, copyright 1996, last updated Jan. 27, 1997; pp. 1 to 14.

Lein Harn et al., "A Software Authentication System For Information Integrity", Computers & Security International Journal Devoted To The Study of Technical and Financial Aspects of Computer Security, vol. II, No. 8, Dec. 1, 1992, pp. 747–752.

Primary Examiner—Bernarr E. Gregory

[57] ABSTRACT

A method to create, distribute and install on an installation computer a uniquely customized instance of a software application that is authenticable and traceable to a particular user. A secure distribution agent resident on a distribution computer collects identifying information, and calculates a cryptographic signature of the software application and identifying information. The identifying information and cryptographic signature are embedded in the software application by the secure distribution agent. The software application with embedded data is transmitted via a distribution channel to the installation computer. A user installation agent resident on the installation computer manages the installation of the software application with embedded data on the installation computer. Prior to installation, the user installation agent may use the cryptographic signature to verify that the software application, and the identifying information are authentic and have not been tampered with.

17 Claims, 10 Drawing Sheets

Figure 6

METHOD AND SYSTEM FOR NETWORKED INSTALLATION OF UNIQUELY CUSTOMIZED, AUTHENTICABLE, AND TRACEABLE SOFTWARE APPLICATION

FIELD OF THE INVENTION

This invention relates to a method and system for the electronic distribution and installation to users via a network of software applications that are uniquely customized, authenticable and traceable to the individual user.

BACKGROUND OF THE INVENTION

With the increasing importance and reliance on networked computer environments such as the Internet, Electronic Software Distribution (ESD) is assuming an increased importance as a means of distributing software applications to users. The on-line infrastructures currently in place enable users to purchase and install software applications without the need for physical delivery of shrink-wrapped software. Typically, a software publisher will prepare a master of the software application for electronic distribution. A customer will then go on-line and submit an order to purchase the software application, which will be received and fulfilled by the publisher. The customer will then download the software application and install it to his/her own computer.

A disadvantage of the current on-line infrastructure is that it delivers software applications to users in a form that is identical with those found in retail stores and catalogues. Absent cryptographic protection, users can freely share the distribution form of the software amongst themselves.

Even where cryptographic protection are present, the potential for unauthorized copying is still significant because all the users possess identical copies (necessarily having identical encryption schemes) of a software application. There is in all such cases a single underlying decryption key, and in most cases this key, or an equivalent variant of it, is entered by the user, who can then share it with other users who can use it to obtain unlicensed usage of the program. There exist today bulletin boards and Internet sites devoted to the sharing of such keys, which are visited by persons interested in obtaining unpaid for usage of programs by applying such keys to copies of the applications they have obtained.

Further, even where more subtle anti-piracy schemes are in place in a software application, it is not uncommon for software "hackers" to produce "crack" programs which can be used to process a freely-distributed, limited functionality version of a program to produce a revised, fully-functional version of the same program which can be used without purchasing a license. Even the most ingenious forms of single-key mass distribution, which might involve input of one-time-only responses to a dynamic challenge to infer the key, are vulnerable to a "crack" which simply causes the application of the "true" universal decryption key. Although such "crack" involves more technical sophistication than sharing of keys as above, the distribution channels and potential effect on the product's revenues are very similar.

In addition, software applications distributed by conventional ESD techniques provide no means to police their own integrity to prevent unauthorized tampering.

Portland Software has produced an electronic software distribution system sold under the trade-mark ZipLock™ a trademark of Portland Software for an electronic software distribution system that packages software for electronic distribution over the Internet. The ZipLock™ system discloses a system that distributes, from a secure server to a client resident on the user's computer, a standard executable software application that is protected by means of a cryptographic key. Data input by the users is transmitted to the secure server and is used to construct a customized digital licence certificate that is transmitted to the user in a separate computer file. The Ziplock™ system does not provide a mechanism to detect tampering done to the executable software application itself, nor does it provide traceability if the digital licence certificate is not included with an unauthorized redistribution of the software application.

The prior art discloses a number of other systems and methods to protect unauthorized use of software electronically distributed to users. In Choudhury U.S. Pat. No. 5,509,074, there is disclosed a method of protecting electronically published materials using cryptographic protocols. A first described embodiment requires special purpose hardware to decrypt the document that is transmitted to the user. This eliminates the method from general use with personal computers used by the general public. In a second method, there is no requirement for special purpose hardware. In this method, the publisher modifies the inter-line or inter-word spaces of the document to make each document unique for each user. The unique document is then encrypted and transmitted to the user's computer. Upon receipt of the encrypted document, the user's computer will prompt the user to enter his/her secret key which is used to decrypt the document for viewing. The method disclosed by this reference does not prevent piracy, it only discourages piracy by making the pirated document traceable to the user. In addition, this reference pertains only to data files, not to the protection of executable files of any type.

In Cane U.S. Pat No. 5,416,840, there is disclosed a method and system for protecting computer program distribution in a broadcast medium, such as radio frequency public broadcast or computer network. In this reference, the method involves encrypting at least a portion of a computer program, the user being supplied with a password for use in decrypting the computer program so that the computer program can be installed and used. A unique password is generated and transmitted to the user for subsequent use in decrypting the selected software program contained on the medium. While there is disclosed a method and system for the generation, transmission and use of unique passwords that cannot be shared among different users of the software application, this reference requires the user to own proprietary hardware that eliminates it from general use with personal computer owned by the general public.

In Yuval U.S. Pat No. 5,586,186, there is disclosed a method and system for controlling unauthorized access to software distributed to users. The main components of the system are an encryptor, a user key generator, and a decryptor. The encryptor generates encryption and decryption keys, encrypts the software using the encryption keys, and stores the encrypted forms of the software of the broadcast medium, such as CD ROM. The user key generator generates a unique key using numeric representations of identifying information supplied by users and the decryption keys. The decryptor is responsible for decrypting the encrypted forms of the software using the identifying information supplied by the user, and the unique user keys. The decryption method disclosed by this reference enables a large number of different but logically similar keys to be used as decryption keys, each of which is unique to a particular user. However, this reference does not disclose a means to customize a software application with user-specific data such that the software application itself can be authenticated.

Furthermore, this reference does not prevent piracy by sharing of keys; it only discourages it through traceability of keys.

SUMMARY OF THE INVENTION

The present invention pertains to a method for the electronic distribution of a software application from a distribution computer to an installation computer comprising the steps of receiving at said distribution computer identifying information, embedding said identifying information in said software application at said distribution computer to form an identifiable software application, generating a cryptographic signature for said identifiable software application, embedding said cryptographic signature in said identifiable software application to form an identifiable and authenticable software application, and transferring said identifiable and authenticable software application from said distribution computer to said installation computer.

The method and system of the present invention discloses an on-line software customization, delivery and installation scheme. Instead of distributing a software application to a user that results in the installation of a totally generic, untraceable executable file on the installation computer, the method and system disclosed herein discloses a means to create, distribute and install on an installation computer a uniquely customised instance of a software application that is authenticable and traceable to a particular user.

The method and system disclosed herein provides for a user installation agent (UIA) resident on an installation computer to establish a connection through a distribution channel to a secure distribution agent (SDA) resident on a distribution computer. The UIA and/or SDA prompt the user to input identifying information that, together with business related information such as licensing terms, etc., is used to create a unique data set that is embedded in the desired software application by the SDA. By the use of a cryptographic hash algorithm, and private/public key cryptography wherein a private key is only known to the SDA, a cryptographic signature of the desired software application and embedded data set is calculated and also embedded into the software application. The software application with embedded data and cryptographic signature is transmitted via a distribution channel to the installation computer where it is installed on the installation computer. Optionally, the installation computer may use the cryptographic signature to verify that neither the software application, nor the embedded data have been tampered with. Public key(s) used to decrypt the cryptographic signatures may be transmitted to the installation computer with the software application, or by any other means, such as e-mail, Internet bulletin boards, etc. Following installation, the embedded data and cryptographic signature are used in a variety of ways, such as to provide a means to trace the software application to the user, to police the continued integrity of the software application, to ensure that license conditions continue to be met, to perform virus checking, or automatic upgrading of the software application itself.

DETAILED DESCRIPTION OF THE PREFERRED EMBODIMENT

Figure 1:
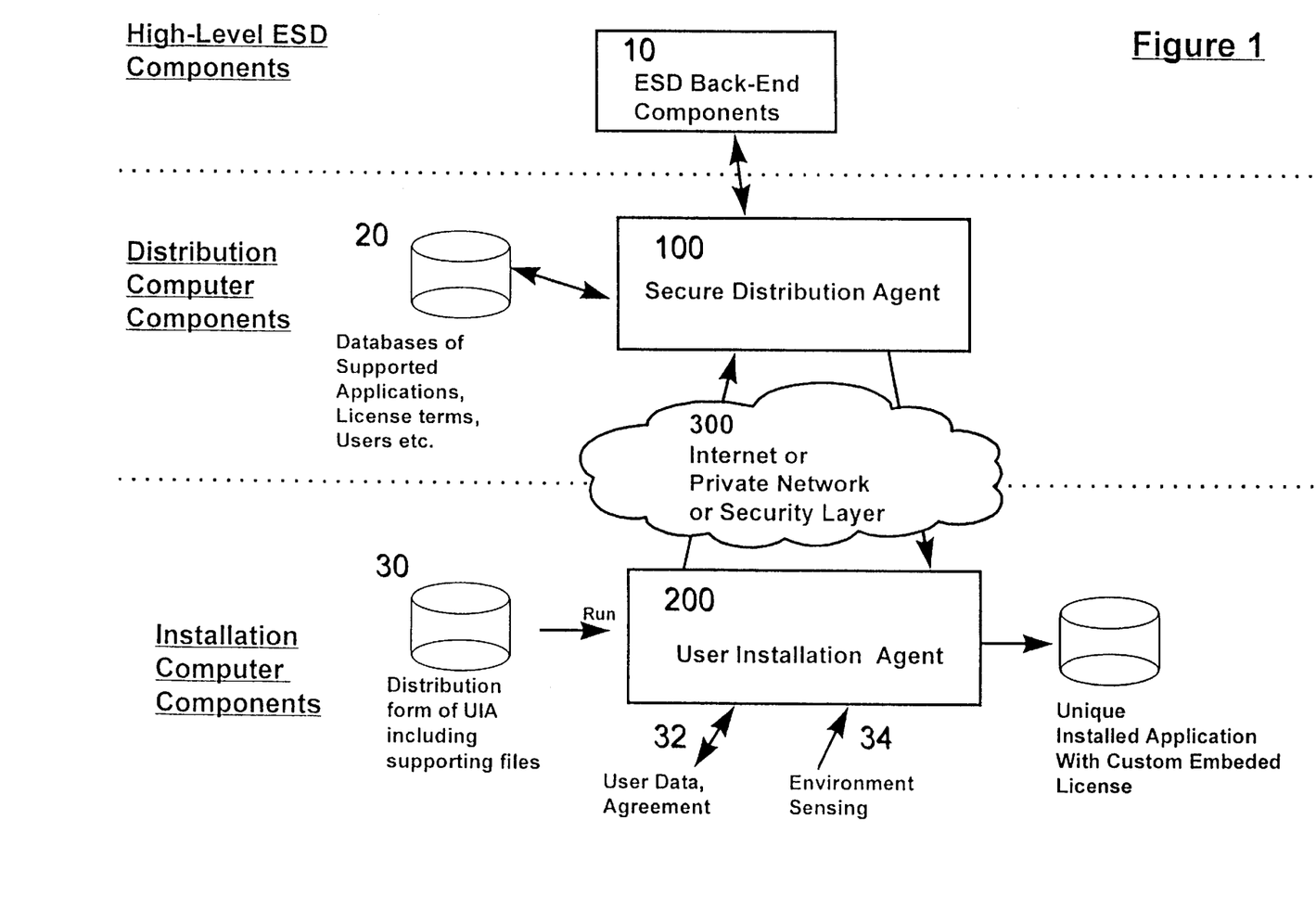
FIG. 1 is a block diagram of a system overview showing the various inputs and components of the system and method of the present invention.

FIG. 1 shows the various inputs and components of the system and method of the present invention. At the top level is shown a representation of the Electronic Software Distribution (ESD) back-end components 10, which include clearinghouses of software, software manufacturers, publishers, credit card servers, etc., all of which interact with a Secure Distribution Agent (SDA) 100 resident on a distribution computer that forms an essential part of the present invention. The SDA 100 interfaces with these ESD back-end components 10 via the Internet or private computer network to provide payment methods support, loading of software applications from publishers, etc. The exact nature of the ESD back-end components 10 may vary without affecting the method and system of the present invention.

The SDA 100 is comprised of a system of co-operating software programs, which run in a secure environment. The nature of the secure environment is immaterial to the invention as long as it ensures the ability to protect the privacy of user data, authentication of users and possibly other third-parties, and suitable limitations on the operations which can be accessed externally. This environment might or might not be physically separated from an installation computer. The structure and operation of the SDA 100 is more fully described in FIG. 2.

One of the inputs to the SDA 100 is a set of databases 20 of supported software applications, license terms, licensed users, etc. The SDA 100 transmits and receives relevant data to/from the databases 20 prior to, and during the operation of the present invention. The exact nature and content of the databases 20 is not an essential feature of the invention.

A distribution channel 300 is illustrated in FIG. 1 that can comprise computer networks such as the Internet, or private network, or a security layer as required to maintain security if the SDA 100 were located in close proximity with a user installation agent (UIA) 200. Alternatively, it may contain some combination of these elements. The distribution channel 300 is used to connect the UIA 200 to the SDA 100 (and thus connect the distribution computer to the installation computer) so that information may be exchanged between these two agents, and so that an aggregate distribution file 170 (shown in FIG. 2) can be distributed from the SDA 100 to the UIA 200. Though the distribution channel 300 is illustrated between the SDA 100 and the UIA 200, the system of the present invention does not require that the SDA 100 be physically distant from the UIA 200.

At a user's end is the UIA 200 which is an installation/automatic upgrade software program resident on the installation computer. This program is used to communicate via the distribution channel 300 to the SDA 100, and to perform the required operations, more fully described below, on the installation computer. Though normally one UIA 200 would be required for each supported software application, persons skilled in the art would be familiar with the capability to develop a UIA 200 that would support multiple software applications. Also shown in FIG. 1 is a distribution form 30 of the UIA 200, including support files. The nature of the distribution form 30 of the UIA 200 is immaterial to the operation of the present invention. Any of CD ROM, World Wide Web (WWW) download, floppy diskette, etc. could be used.

The UIA 200 accepts data 32 input from the user, such as name, address, payment options, etc., as well as data pertaining to the acceptance of an end-user license.

Environment sensing data 34 such as speed of CPU, size of hard disk, speed of modem, etc. may also be input to the UIA 200 for processing. The identifying information processed by the UIA 200 may include any information pertaining to the purchaser, the seller, the installation agent, date, serial number, license specifics, etc. This data may be used for the automatic registration of the desired software application with a publisher or its commercial proxies.

As noted above, the identifying data 32, 34 constitutes identifying information concerning the user, its computer, etc. The identifying data 32, 34 is processed by the UIA 200 and transmitted to the SDA 100 via the distribution channel 300. Of course, it is understood that the identifying information does not necessarily have to be transmitted to the SDA 100 by means of the distribution channel 300. For example, the identifying information may be locally entered into the SDA 100 by an agent using information received verbally, in writing, or in some other non-electronic manner. The SDA 100 combines the identifying data 32, 34 with the data stored in the databases 20 to produce an aggregated distribution file 170 that is uniquely customized, authenticable, and traceable to the user. The aggregate distribution file 170 is transmitted via the distribution channel 300 to the UIA 200. The output from the UIA 200 is a uniquely customized software application 15 (to be referred to below as an "installed aggregate distribution file") installed on the installation computer, with identifying information embedded therein.

Though the description of the present invention implies that the "user" is an individual user of the software application 15 to be installed on a personal computer, persons skilled in the art will appreciate that the present invention would also operate in the context of a networked end-user environment, where the "user" was a network administrator responsible for installing software on a central server for use by a number of end users.

Figure 2:
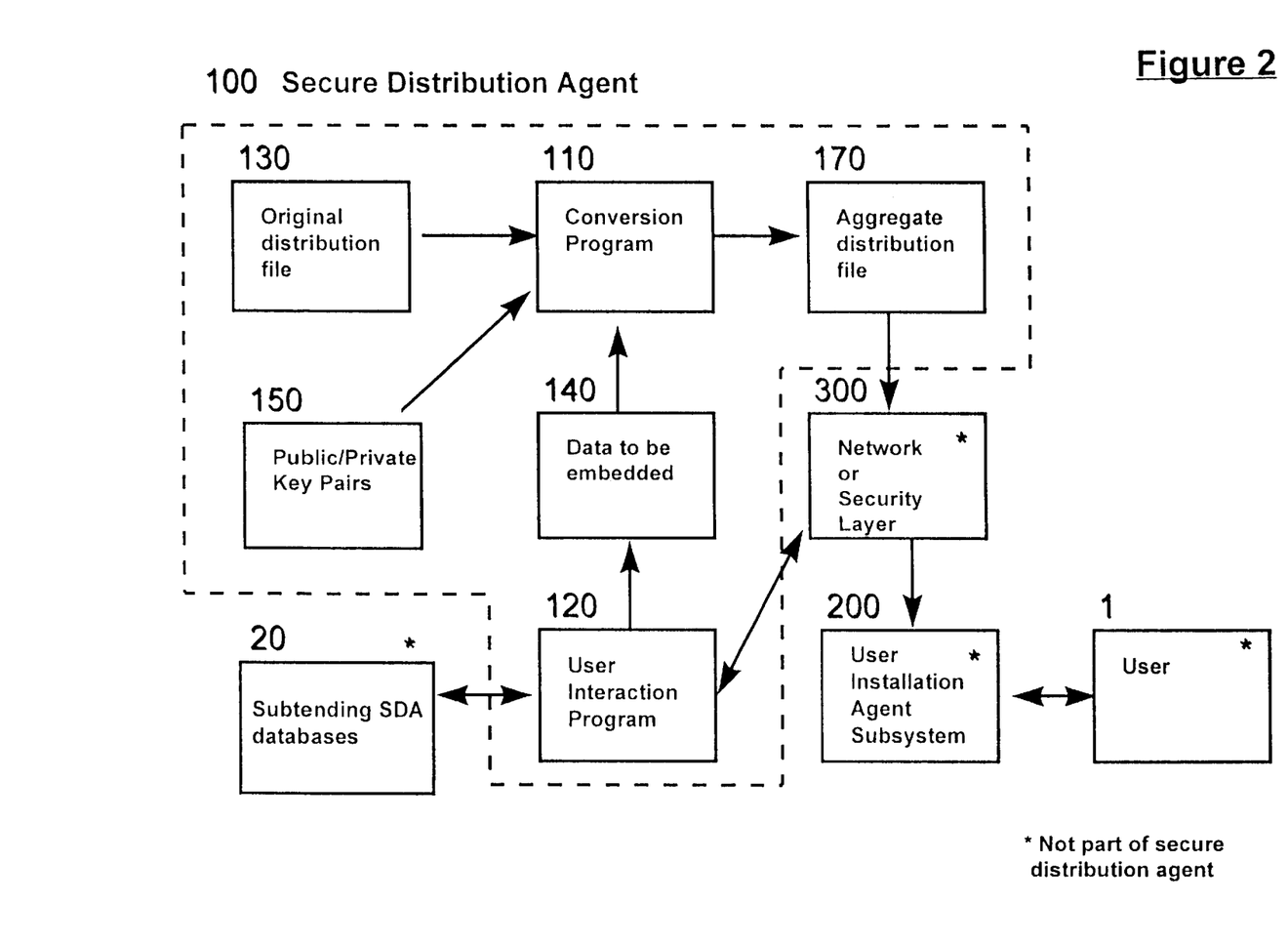
FIG. 2 is a data flow diagram of the structure and operation of the Secure Distribution Agent employed by the present invention.

FIG. 2 is a data flow diagram of the structure and operation of the SDA 100 employed by the present invention. An original distribution file 130 is shown as an input to a conversion program 110. In the envisioned implementation, the original distribution file 130 is input to the SDA 100 by the databases 20 shown in FIG. 1. It is understood that the original distribution file 130 does not necessarily have to be input to the SDA 100 by the databases 20, since the original distribution file 130 may already be resident on the distribution computer containing the SDA 100. The conversion program 110 has, as additional inputs, the data 140 to be embedded in the distribution file 130, and required public/private cryptographic key pairs 150. The embedded data 140 is produced by a user interaction program 120 which interacts with the user through the UIA 200 to receive identifying data 32, 34 (shown in FIG. 1) as well as data from the databases 20 of supported software applications, license terms, licensed users, etc.

While the embedded data 140 can be of any form and content, it is anticipated that the embedded data 140 will contain information enabling the software application 15 to be traceable to an individual user and license transaction. For example, the embedded data 140 can include a unique serial number used to identify the aggregate distribution file 170 to be distributed to the user. The would eliminate serial number fraud that is common in the software industry, whereby current software applications can only perform simple validity checks, which can be fooled by widespread fraudulent re-use of a single valid serial number. The embedded data 140 may take the form of a complete license agreement customized to the individual user, including user name, address, software serial no., license terms, etc. Records of the user information collected by the user interaction program 120 may be kept by the databases 20.

The output of the conversion program 110 is an aggregate distribution file 170 which contains both the contents of the original distribution file 130, the embedded data 140, as well as a cryptographic signature of the embedded data 140 and the original distribution file 130. The aggregate distribution file 170 is then transmitted via the distribution channel 300 to the UIA 200. The UIA 200 then installs the aggregate distribution file 170 on the installation computer. Once the aggregate distribution file 170 is installed, it takes the form of an installed aggregate distribution file 15.

By means of its connection with the UIA 200, the SDA 100 can negotiate arbitrary license terms with the user, display an End-User License Agreement (EULA), confirm acceptance of that agreement, and automatically perform on-line registration of the software based on the already-established identity of the user and the specific license terms. Subject to commercial and legal considerations, an SDA 100 could offer different pricing and license terms, and possibly different executable versions, to users in different countries, for example. In addition, differential pricing based on attributes of the installation computer such as CPU power could be provided.

The SDA 100 does not require intelligence within itself for functions such as establishing that a user's stated address and credit-card number are valid, consistent, and within a given geographical area. Such functions may be undertaken by the high-level ESD components 10 illustrated in FIG. 1.

Figure 3A:
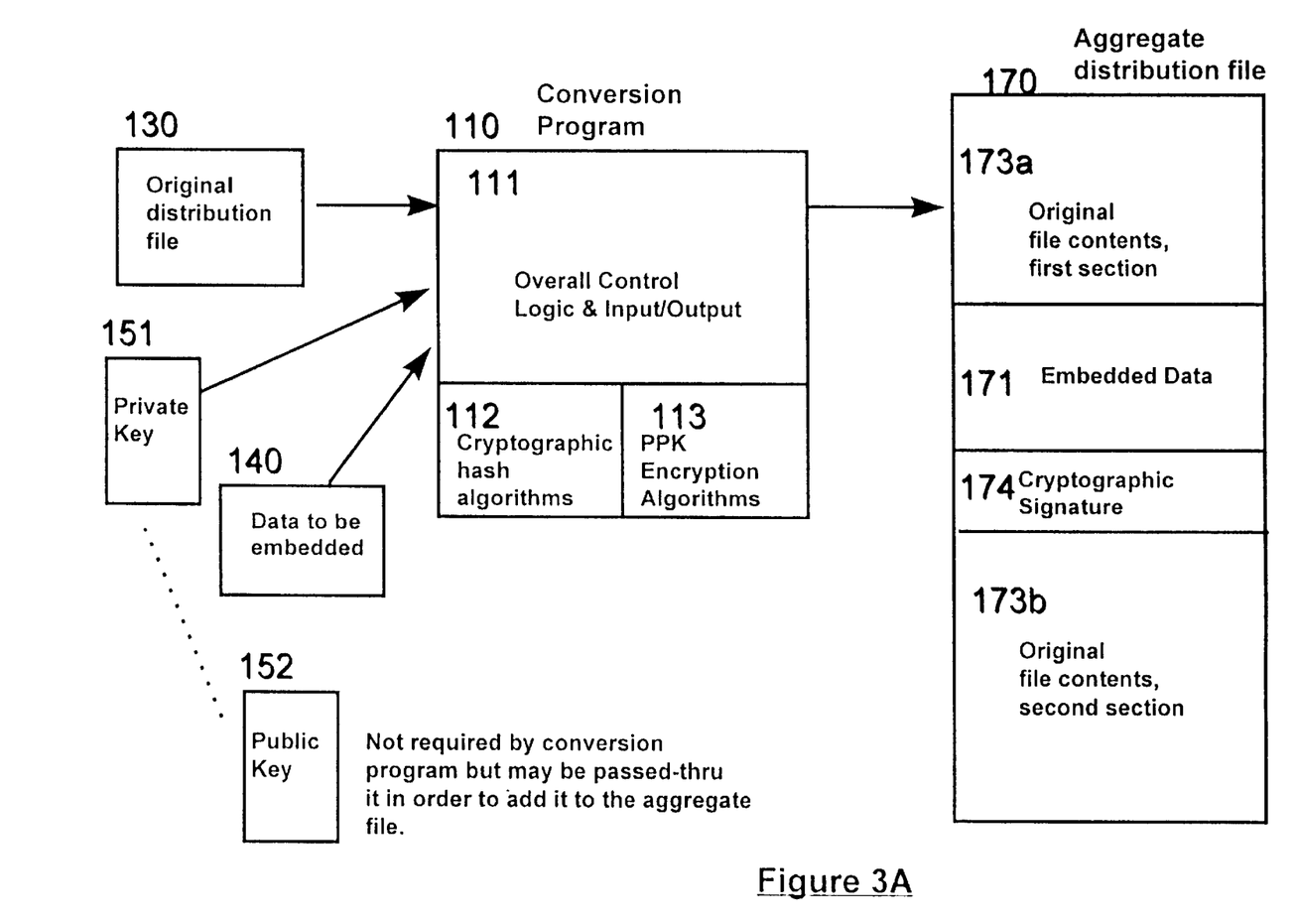
FIG. 3A is a block diagram showing details of the construction of the aggregate distribution file using a one-step cryptographic process.

FIG. 3A shows the procedure for constructing the aggregate distribution file 170 in greater detail. For the sake of illustration, the original distribution file 130 is assumed to have a structure including header information and different types of internal sections for code, static data and so on, such as a Windows™ 'Portable Executable' (PE) program file. One of ordinary skill in the art can appreciate that the method and system of the present invention can be applied to a number of different file formats. Similarly, the inputs 140, 151 to the conversion program 110, and output 170 from the conversion program 110 are illustrated to be computer files, but they could be in-memory images, streams from other processors, etc.

A typical sequence of steps run by the SDA 100 to construct the aggregate distribution file 170 is described below.

1. The conversion program 110 is run, as a result of the user interaction program 120 having determined that a conversion is required i.e. that a delivery of a particular aggregate distribution file 170 according to the method of the present invention is authorized, and that the required embedded data block 140 has been constructed. All subsequent steps are executed by the conversion program 110 unless otherwise indicated.

The object is to obtain what is often referred to as a "digital signature", or "cryptographic signature" which inherently has two aspects:

(i) By the use of a cryptographic hash algorithm, the production of a cryptographic fingerprint that uniquely corresponds to the data "ed" 130, 140; and (ii) Protection of that cryptographic fingerprint by encrypting it with a private key, such that the recipient of the cryptographic fingerprint may, by using a public key and the cryptographic algorithm, verify that the data "ed" 130, 140 is intact, without having the ability to generate a new cryptographic fingerprint, and plausibly change the data.

These two steps are essential to realize the advantage of the present invention, since without both steps a third party may intervene and alter data without the recipient being able to detect it. This procedure is to be distinguished from simply encrypting the data "ed" 130, 140, which is a step that is not necessary to the operation of the present invention since there is no way to plausibly alter the data 130, 140 without such alterations being detectable.

2. The input/output logic 111 of the conversion program 110 reads in the desired original distribution file 130, its corresponding cryptographic private key 151, and the data to be embedded 140. Though not required by the conversion program 110, a public key 152 may be passed through in order that it may be added to the aggregate distribution file 130. Utilizing cryptographic hash algorithms 112 and Public-Private key (PPK) encryption algorithms 113, a cryptographic signature 174 is produced. The basic steps of this process are:

2.1 Apply a one-way hash function "hf" to the data "ed" 130, 140 producing a cryptographic fingerprint "edh", that is edh=hf(ed). The requirements for this cryptographic fingerprint are as follows: (i) that it produce a reasonably compact result i.e. size(edh)<<size(ed), and preferably a fixed-length result; (ii) that the fingerprint alone cannot be used to ascertain the original data block back i.e. there is no back-hash function "bhf" such that bhf(edh)=ed; (iii) that it be extremely sensitive to changes in "ed"; say, that a single-bit change in "ed" changes on average 50% of the bits in "edh", and (iv) that it is extremely difficult to construct a false embedded data block "fed" which produces the same fingerprint as "ed", that is hf(ed)=hf(fed). There are a number of algorithms which satisfy these requirements, such as MD5 (Message Digest 5) and SHA (Secure Hash Algorithm). Other algorithms that also meet the above criteria that may be employed by the present invention.

2.2 Encrypt the cryptographic fingerprint "edh" using the private key 151 "prk" and a public/private encryption function "ppef" to produce a cryptographic signature "edf" 174, that is: edf=ppef(prk, edh). The requirements for the encryption function "ppef" are as follows: (i) that it produce a result not substantially larger than its input; (ii) that it effectively protect relatively short data sets, since "edh" will be bytes long rather than kilobytes long; (iii) that is computationally infeasible to use the public key 151 ("puk") and the cryptographic signature "edf" 174, or multiple instances of "edf" 174 (which will be visible on the installation computer) to infer the private key "prk", that is, there is no cracking function "cf" such that: puk=cf(edf,puk); (iv) that there is no conceivable means of replicating the behaviour of "ppef" using "prk" without in fact possessing both "ppef" and "prk". In principle, "ppef" can be inferred from its corresponding decryption function, so "prk" is the important secret in practical terms; (v) that the corresponding public-key decryption function "ppdf" have acceptable performance on a typical installation computer for the pertinent file sizes. Note that if a specific ppef/ppdf is chosen for security reasons and does not yield acceptable performance, the encryption could be applied to only a portion of the selected files and still offer the same benefits; (vi) that it be suitable (preferably, via established cryptanalysis) for specific application in this domain i.e. digital signatures. There are a number of algorithms which might satisfy these requirements, such RSA and those of Rabin and ElGamal. The careful selection of implementation parameters can help attain required security and performance.

3. The cryptographic signature 174 from step 2.1, and the data to be embedded 140 are inserted into the original distribution file 130 to produce the aggregate distribution file 170. This insertion is not a simple copying of bits into the middle of a file, since it must be compliant to the format requirements of the particular file types. For example, headers may have to be updated to identify the new data etc.

The system and method of the present invention does not require that the embedded data 171 or the cryptographic signature 174 be positioned in any particular manner in the aggregate distribution file 170. What is necessary is that: (i) the software on the installation computer, and the UIA 200 in particular, be able to locate the embedded data 171 and cryptographic signature 174, and (ii) that the aggregate distribution file 170, after it is installed on the installation computer, be able to perform its intended function; for example, if it is an executable file, that it still conform to structural and other platform requirements so it can load and run on the installation computer as it might have before the conversion process. For example, if the file were in a format common to current computers containing an Intel™ microprocessor and running a Microsoft™ Windows™ operating system, the conversion program 110 could inspect the "header" section of the original distribution file 130 to determine where there were sections containing static data so as to avoid sections containing executable code. A static data section would be selected and a suitable location for the embedded data block 171 and cryptographic signature 174 would be found or created. This would be done by, for example, (i) determining that an existing static data block had unused capacity sufficient to add the data, (ii) allocating a new static data block, or (iii) expanding an existing static data block.

The method illustrated in FIG. 3A discloses a one-step process wherein cryptographic signature 174 is ascertained for the original distribution file 130 and the embedded data 140. An optional method, such as that illustrated in FIG. 3B, would be to employ a two-step process wherein a cryptographic signature 172 of the embedded data 171 is first produced using the same algorithm described in step 2 above. This embedded data cryptographic signature 172 is then itself embedded into the original distribution file 130. The original distribution file 130, embedded data 171, and embedded data cryptographic signature 172 are then input to the second cryptographic step, wherein an overall cryptographic signature 176 is ascertained using the same algorithm described in step 2 above. The benefit of the two step process is that it augments the capabilities of the system and method of the present invention to authenticate and detect tampering in the software application installed on the installation computer. For example, separate cryptographic public/private key pairs could be provided for the two cryptographic signatures 172, 176. Furthermore, the two-step process allows the embedded data 171 to be extracted and authenticated, even if the original file contents 173a, 173b have been corrupted.

Another alternative is to construct the aggregate distribution file 170 using a variation of the two-step cryptographic process wherein a first cryptographic signature 175 is made of only the original file contents 173a, 173b, and a second cryptographic signature 172 is made of the embedded data 171. This is illustrated in FIG. 3C. This scheme has all the advantages of the two-step process illustrated in FIG. 3B, and also allows for separate authentication of the embedded data 171 and the original file contents 173a, 173b. This would allow a user to verify that original distribution file 130 provided by the publisher had not been altered by the on-line installation process disclosed by the present invention.

Figure 3B:
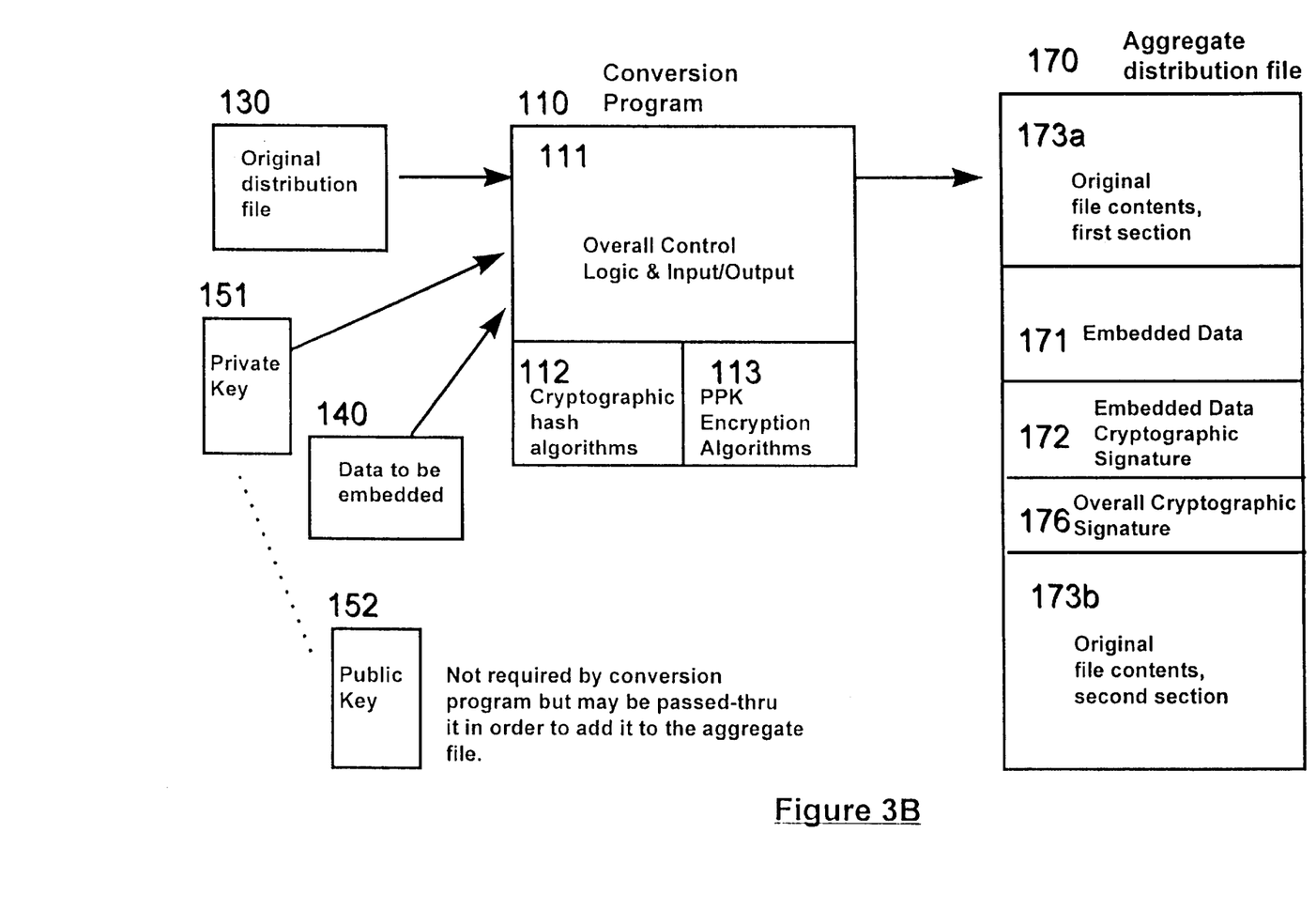
FIG. 3B is a block diagram showing details of the construction of an aggregate distribution file using a two-step cryptographic process.
Figure 3C:
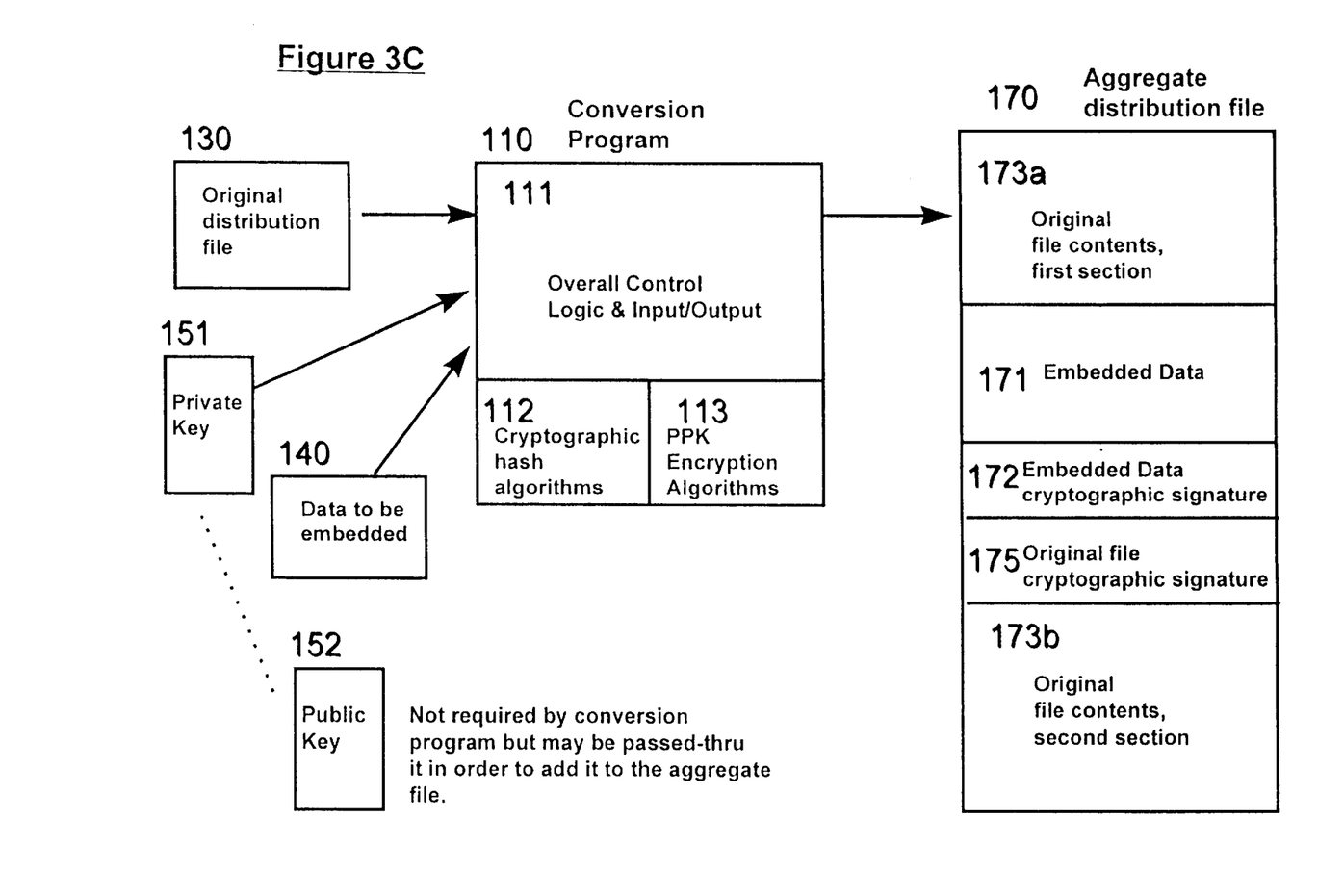
FIG. 3C is a block diagram showing details of the construction of an aggregate distribution file using a cryptographic process that is a variant of the two-step cryptographic process shown in FIG. 3B.

One of ordinary skill in the art will appreciate that any of the cryptographic signatures 172, 174, 175, 176 shown in FIGS. 3A, 3B and 3C do not have to be produced using the same set of cryptographic public/private key pairs, or even the same cryptographic algorithms. As well, it is not necessary that the cryptographic signatures 172, 174, 175, 176 be calculated each time an aggregate distribution file 170 is distributed to a user. The SDA 100 could maintain a database of partially-precomputed signatures to speed up the related calculations. The availability of cryptographic hardware support such as RSA co-processors in the installation computer, could be used to attain good responsiveness with maximal security. As well, it is not essential that the aggregate distribution file 170 be constructed in its entirety by the SDA 100. What is necessary is that the aggregate distribution file 170 be derivable in its entirety by the UIA 200.

Figure 4:
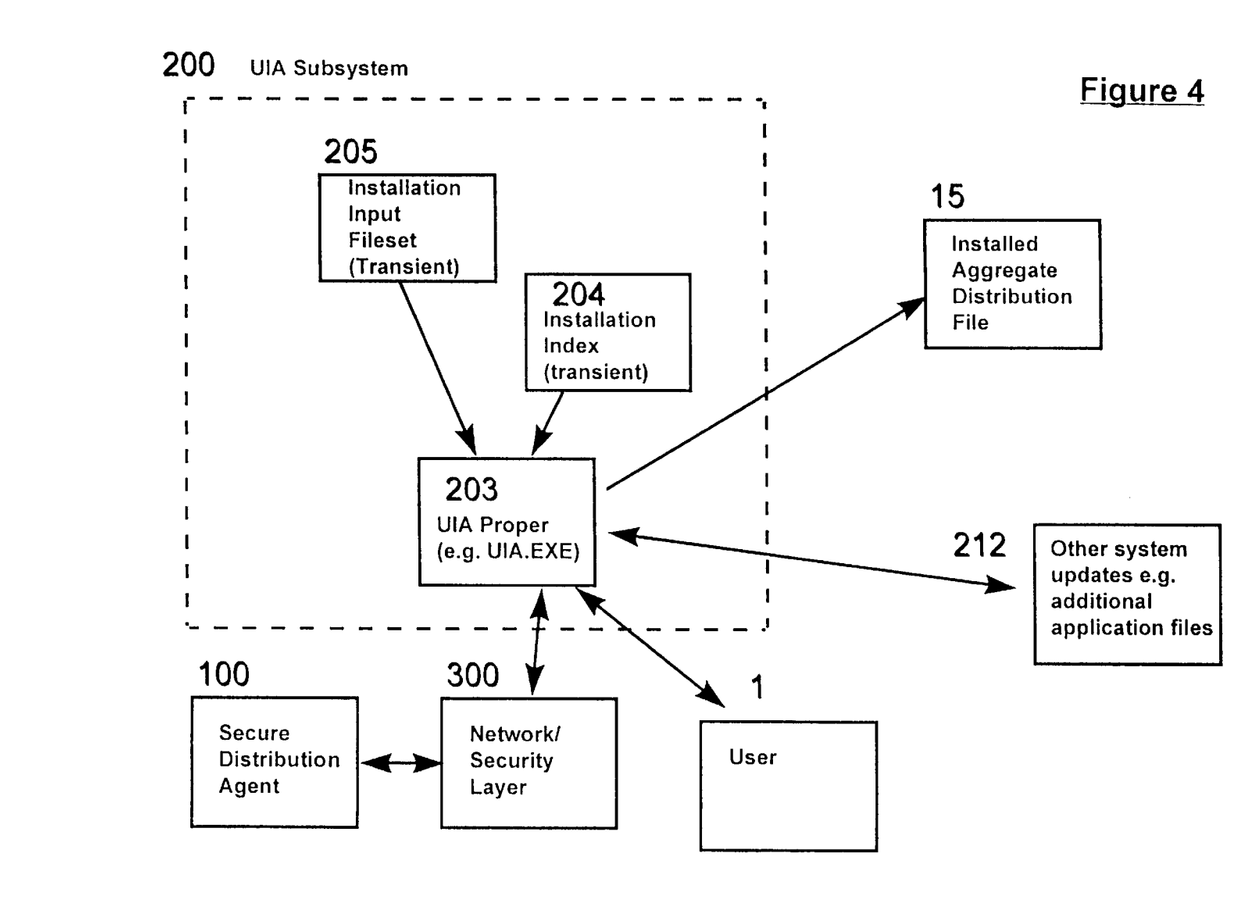
FIG. 4 is a block diagram of the structure and operation of the User Installation Agent employed by the present invention.

FIG. 4 illustrates the structure and operation of the UIA 200 which consists of a transient installation index 204, a transient installation input fileset 205, and a UIA proper executable software program 203. One skilled in the art will appreciate that there are many ways in which the UIA program 203 could be implemented. Since a significant part of the UIA's 200 functionality involves user interaction and dialog with the SDA 100, options for the implementation of the UIA 200 include either making it an adjunct to a World Wide Web (WWW) browser, or implementing it as a stand-alone program which itself embeds or invokes already-present browser capability on the installation computer.

A typical execution sequence of the UIA 200 is described below:

1. After the UIA program 203 and its support data 204, 205 have been copied onto the installation computer, the user runs the UIA program 203. Note that the UIA program 203 could also have been initiated remotely e.g. sent as an active program within a browser framework by a WWW server. Unless otherwise stated, all subsequent steps are executed by the UIA program 203.

2. The installation index 204 and installation input fileset 205 are read by the installation computer to determine the particular default SDA 100 appropriate for the installation of the desired software application (known as the "installed aggregate distribution file") 15.

3. The installation computer is examined to determine the probable means of establishing communications with the SDA 100, for example, the presence of TCP/IP network interfaces, modems etc. If no such means are found, the program optionally assists the user to find parameters which will work properly, then fails with a warning. This is because access to the SDA 100 is essential for operation of the invention.

4. The user 1 is prompted with the default data from steps (2) and (3) above, i.e. informed where the UIA program 203 will look for the desired SDA 100, and over what sort of distribution channel 300. The user 1 is then given an opportunity to change this information, either for commercial reasons (e.g. maybe an SDA has changed names or locations), or for technical reasons (e.g. the user does not have working TCP/IP connectivity and wants to use a straight modem link, perhaps via an 800 number.)

5. Via the distribution channel 300, the UIA program 203 establishes contact with SDA 100. If this cannot be done, the UIA program 203, after optionally helping the user determine parameters which will work properly, fails with a warning. While the security of the distribution channel 300 is optional to the operation of this invention, it is expected that the distribution channel 300 will support appropriate protocols to protect the SDA 100 from fraud. A common protocol supporting authentication and privacy, such as Secure Sockets Layer (SSL) is appropriate.

6. The UIA program 203 acts as an intermediary between the user and the SDA 100, enabling the user 1 to establish any legitimate agreement which the SDA 100 supports with respect to the desired installed aggregate distribution file 15. The UIA program 203 also has the ability to determine whether the available system resources of the installation computer meet the requirements of the desired installed aggregate distribution file 15.

There are no technical limits to the variety of options that can be displayed to the user, the questions the user might be asked, the data that might be gathered about the installation computer, etc. Since the SDA 100 is being run throughout the data gathering, data embedding, software distribution and software installation process, the system and method of the present invention can employ various levels of cryptography without the user ever being informed of the cryptographic keys, or any information from which they could be derived. This is unlike other electronic delivery systems which typically require subsequent off-line entry of 'secret keys' or derivates thereof which have been explicitly divulged to the user. Of course, public keys used for the authentication of cryptographic signatures are an exception in that the user may be able to determine them easily, however this is not a security issue since they have no fraudulent application.

7. Assuming that the user 1 meets all the criteria set out by the SDA 100, the SDA 100 will determine a specific set of files that must be transmitted to the UIA 200 to complete installation on the installation computer, notably including at least one aggregate distribution file 170 (shown in FIGS. 3A–3C). It is immaterial to the system and method of the present invention what is the nature of the agreement entered into between the user 1 and SDA 100, or how it is validated. That is the responsibility of the SDA 100 and its subtending commercial systems 10, if any. Most importantly, the UIA 200 does not and cannot itself decide whether an agreement has been reached between the user and the SDA 100. The UIA 200 does not have, and should not have, access to all the information required to complete the installation, except through interaction with the SDA 100.

8. The SDA 100 transmits an index of the required distribution files to the UIA 200 via the distribution channel 300. The UIA 200 uses this index to augment its own local index 204 forming a complete index for the upcoming installation.

9. The SDA 100 constructs one or more aggregate distribution files 170 and any other files required for the installation, and transmits these files to the UIA 200 via the distribution channel 300.

10. Using its local index and support files 204, 205 the UIA program 203 completes the installation of the installed aggregate distribution file 15 in a manner compliant with the platform of the installation computer. In particular, the UIA 200 installs the aggregate distribution file 170 such that the cryptographic signature 174 and the embedded data 171 are unaffected. Once the aggregate distribution file 170 is installed on the installation computer, it is referred to as an installed aggregate distribution file 15. The UIA program 203 will also perform other system updates 212 as necessary, such as updating the operating system registry (in the case of Windows 95™), and installing any additional application files. Other optional operations, such as leaving an appropriate 'uninstall' utility, may also be involved.

12. If an error should occur, the UIA program 203 may signal the SDA 100 to re-initiate the installation. If no error has occurred, the UIA program 203 signals the SDA 100 that all required data has been received. This could, for example, be used as the trigger signal for the SDA 100 to commit to a financial transaction. Leaving the financial commit to this late part of the process minimizes the probability of the user being charged for a software application which has not been successfully installed, thus reducing one cause of customer frustration.

13. The UIA program 203 deletes any transient files, indices etc. that it might have placed on the installation computer.

14. The UIA program 203 disconnects from the SDA 100 and the distribution channel 300 and exits.

Upon successful completion of the optional authentication procedures described in further detail below, the user can then run the installed aggregate distribution file 15 on the installation computer. It should be understood that the authentication procedures described below can be done either before or after the installation is completed.

The method and system of the present invention would diminish disputes arising from software which is purchased but not successfully installed. The UIA 200 can detect and warn the user if the installation computer had inadequate resources to run the desired software application, before any financial transaction has been made. Further, the final financial commitment to purchase the software application by the user can be done late in the installation process so that the probability of the financial transaction being successful, but the installation itself failing, would be low.

One of ordinary skill in the art will appreciate that the UIA 200 may be distributed to users in a mass-produced media form containing the original distribution file 130, or a derivative thereof not subject to successful fraudulent re-use through simple copying. In this scenario, the SDA 100 would transmit to the UIA 200 only the incremental information which the UIA 200 would require to construct the aggregate distribution file 170 and complete the installation. Any attempts to pirate the software application can be defeated by ensuring that the distribution form of the UIA 200 contains an incomplete set of executable files, thereby requiring essential data from the SDA 100 to be capable of executing on the installation computer.

Figure 5:
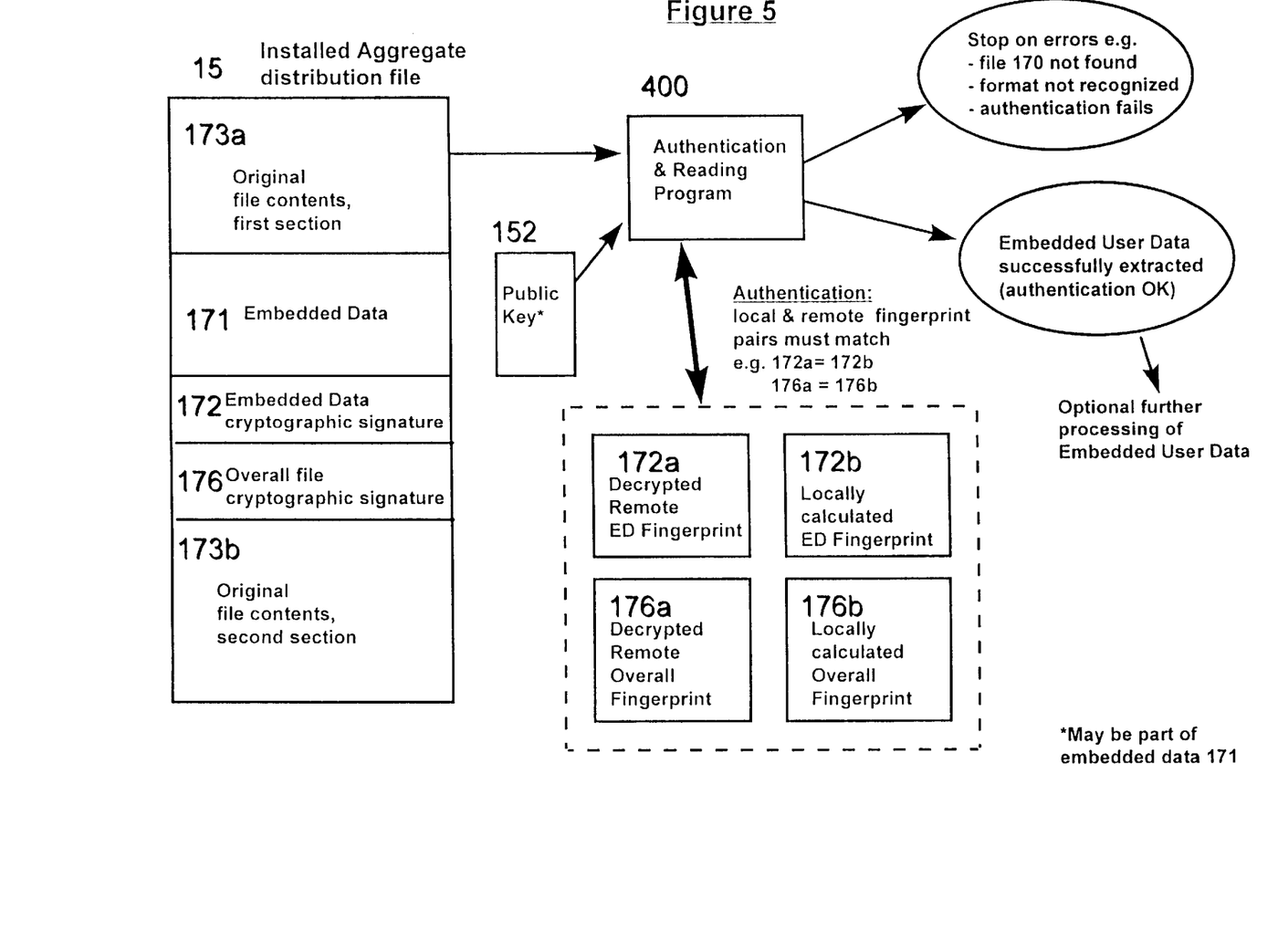
FIG. 5 is a block diagram showing the means of extracting and authenticating embedded data from an installed distribution file.

FIG. 5 illustrates the means of authenticating and extracting user data from an installed aggregate distribution file 15 to verify that neither the original file contents 173*a*, 173*b*, nor the embedded data 171 have been tampered with. This step is optional to the operation of the present invention because the installed aggregate distribution file 15 may be run by the user without authentication. It should be understood that the authentication procedures described below can be done either before or after the installation is completed. If authentication is done prior to installation on the installation computer, then the following procedures are directed by the UIA 203 to the aggregate distribution file 170, instead of the installed aggregate distribution file 15.

The process illustrated in FIG. 5 is in relation to an installed aggregate distribution file 15 constructed using the two-step process illustrated in FIG. 3B. The principles of authenticating and extracting user data from an installed aggregate distribution file 15 constructed using the one-step cryptographic process illustrated in FIG. 3A, or the variant of the two-step process illustrated in FIG. 3C, are the same as those described below, with appropriate modifications, depending on the nature of the cryptographic signatures to be compared.

Though a separate authentication and reading program 400 is shown performing the functions of authentication and reading of embedded data 171, a person skilled in the art will appreciate that these functions need not be embodied in such a stand-alone program, and could be incorporated as functions of other programs, such as the UIA 200, a license-checker, a virus-checker, a program loader, a copy program, etc. A typical execution sequence of the authentication and reading program 400 is described below:

1. The authentication and reading program 400 is run, either by a user or by automatic invocation from another program such as the UIA 200. Unless otherwise indicated, the following steps are all executed by authentication and reading program 400.

2. Determine which installed aggregate distribution file 15 to process, either by prompting the user or having this passed as a parameter by the UIA 200. Also determine (if derivable therefrom in the particular implementation, as opposed to being contained in the file itself), which particular public key 152 is applicable to this installed aggregate distribution file 15.

3. Open the installed aggregate distribution file 15 in question and check that it meets the applicable format requirements. For example, a given implementation might support executable (EXE) and dynamic link library (DLL) files in the 'PE' format for Intel™ processors. If the installed aggregate distribution file 15 fails these basic checks, or is not found, the authentication and reading program 400 fails with an appropriate warning.

4. Examine the file to determine the location of the overall cryptographic signature 176, the embedded data cryptographic signature 172, and the embedded data 171. The installed aggregate distribution file 15 can be formatted in various ways to support this, such as including pointers to these sections in the file header. If applicable in the particular implementation, (i.e. the public key 152 is included in the file as opposed to being otherwise determined the authentication and reading program 400), find and extract the required public key 152.

If any of the above steps fail, the authentication and reading program 400 fails with an appropriate warning.

5. Use the public key 152 to decrypt the overall cryptographic signature 176 into its unencrypted form 176*a* (the decrypted remote overall fingerprint).

6. Using the same known cryptographic signature algorithm as was employed by the SDA 100, calculate a local version 176*b* (the locally calculated overall fingerprint) of the overall cryptographic signature. This calculation will necessarily exclude the overall cryptographic signature 176 itself i.e. cover all parts of the installed aggregate distribution file 15 except 176, in order that the locally calculated overall fingerprint 176*b* will not depend on itself.

7. Compare the locally calculated overall fingerprint 176*b* to the decrypted remote overall fingerprint 176*a*. If they differ, the authentication and reading program 400 will fail with a warning that the installed aggregate distribution file 15 has been corrupted. At this point, the UIA 200 may be invoked to contact the SDA 100 to re-acquire the installed aggregate distribution file 15.

8. Extract the embedded data 171 and present it graphically to the user, if the program has been user-invoked, or pass it in message form to the invoker routine, if software-invoked.

9. Use the public key 152 to decrypt the embedded data cryptographic signature 172 into its unencrypted form 172*a* (the decrypted remote embedded data fingerprint).

10. Calculate a local version 172*b* (the locally calculated embedded data fingerprint) of the embedded data cryptographic signature 172 using the same known cryptographic signature algorithm as the SDA 100 used.

11. Compare the locally calculated embedded data fingerprint 172*b* to the decrypted remote embedded data fingerprint 172*a*. If they differ, the authentication and reading program 400 will fail with a warning that the embedded data 171 has been corrupted.

A similar procedure of comparison would be followed in respect of the cryptographic signature 174 if the one step process illustrated in FIG. 3A had been followed. As well, a similar procedure of comparison would be followed in respect of the original file contents cryptographic signature 175 if the variant of the two-step cryptographic process illustrated in FIG. 3C had been undertaken.

Figure 6:
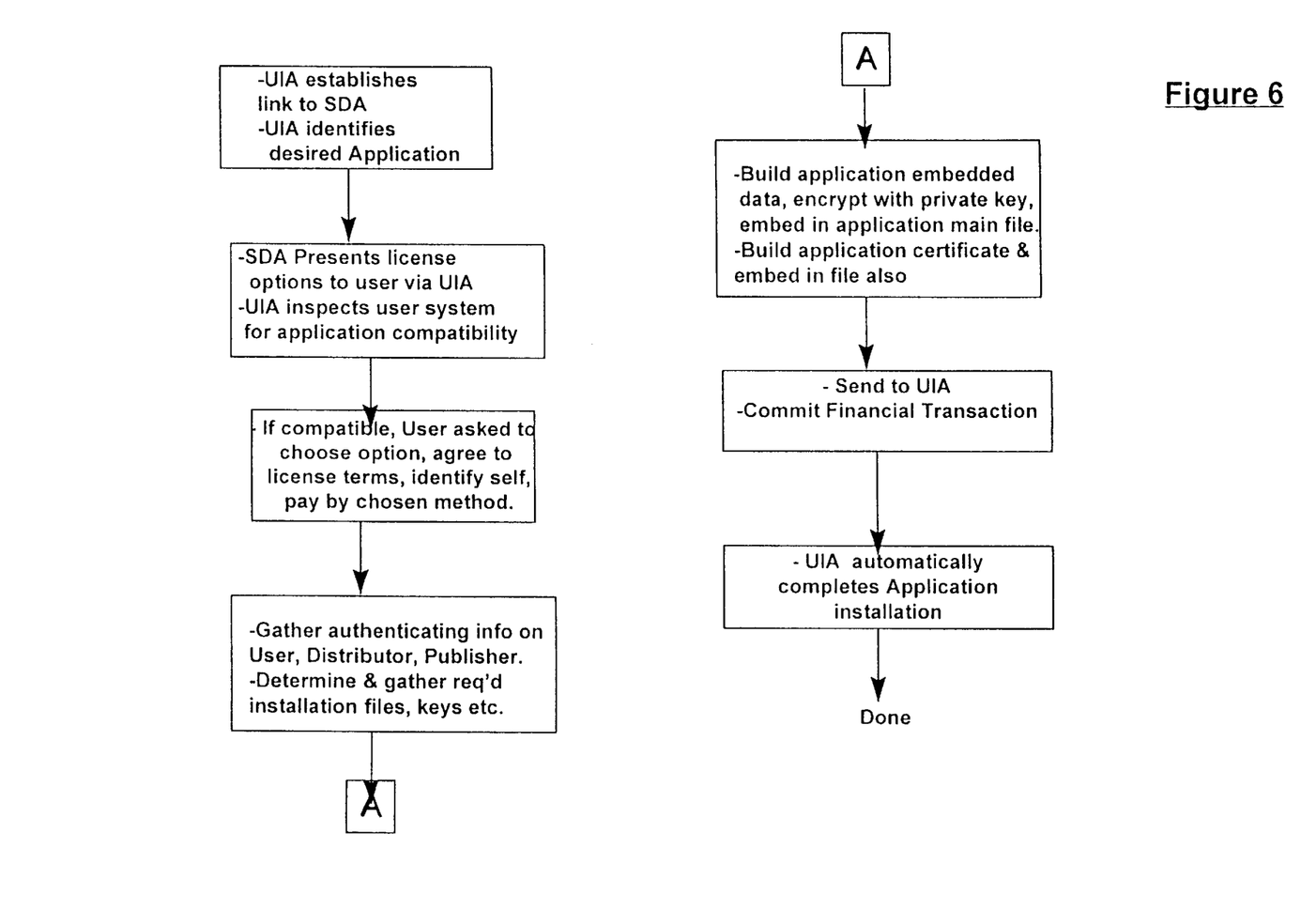
FIG. 6 is a flow chart of a first embodiment of the present invention that authenticates embedded data by means of a common encryption key.

FIG. 6 is a flow-chart of a summary of the procedures described in relation to FIGS. 2, 3A, 3B, 3C, 4 and 5. It should be noted that the public key 152 used to authenticate the integrity of the installed aggregate distribution file 15 could be delivered to the UIA 200 by any means since it is not a secret and might be useful for more than one purpose. For example, the public key may be embedded in the aggregate distribution file 170, it may be explicitly sent to the user as a separate file or message, or it may be obtained automatically by the installation computer from a network trusted authority (e.g. Verisign™ Inc.)

Figure 7:
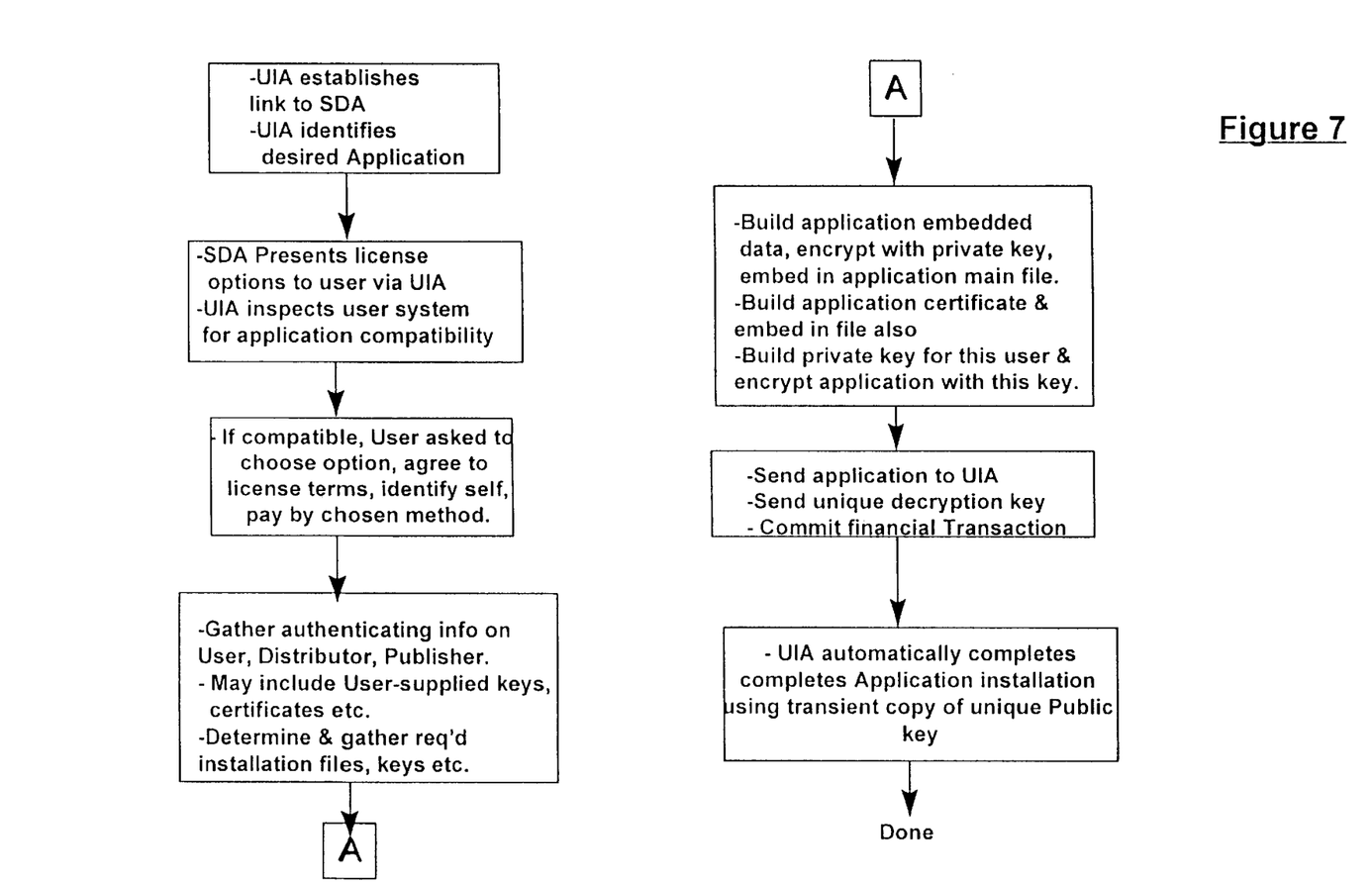
FIG. 7 is a flow chart of a second embodiment of the present invention that authenticates embedded data by means of a unique per-user encryption key; and, FIG. 8 is a block diagram showing the various uses of the installed software application delivered to the user by means of the present invention.

FIG. 7 is a flow-chart of another set of procedures that may be employed in accordance with the present invention, whereby the original file contents 173*a*, 173*b* are encrypted using a unique private key calculated by the SDA 100 for this particular transaction. A record of this unique private key is kept by the SDA 100, and the corresponding unique public key is transmitted with the aggregate distribution file 170 via the distribution channel 300 to the UIA 200. The UIA 200 will decrypt the aggregate distribution file 170 using the public key. For security reasons, it is preferred that this public key not be permanently stored on the installation computer. Instead, the unique public key would exist only in the computer's Random Access Memory (RAM) for the duration of the installation. This makes usable redistribution of the aggregate distribution file 170 practically impossible.

Figure 8:
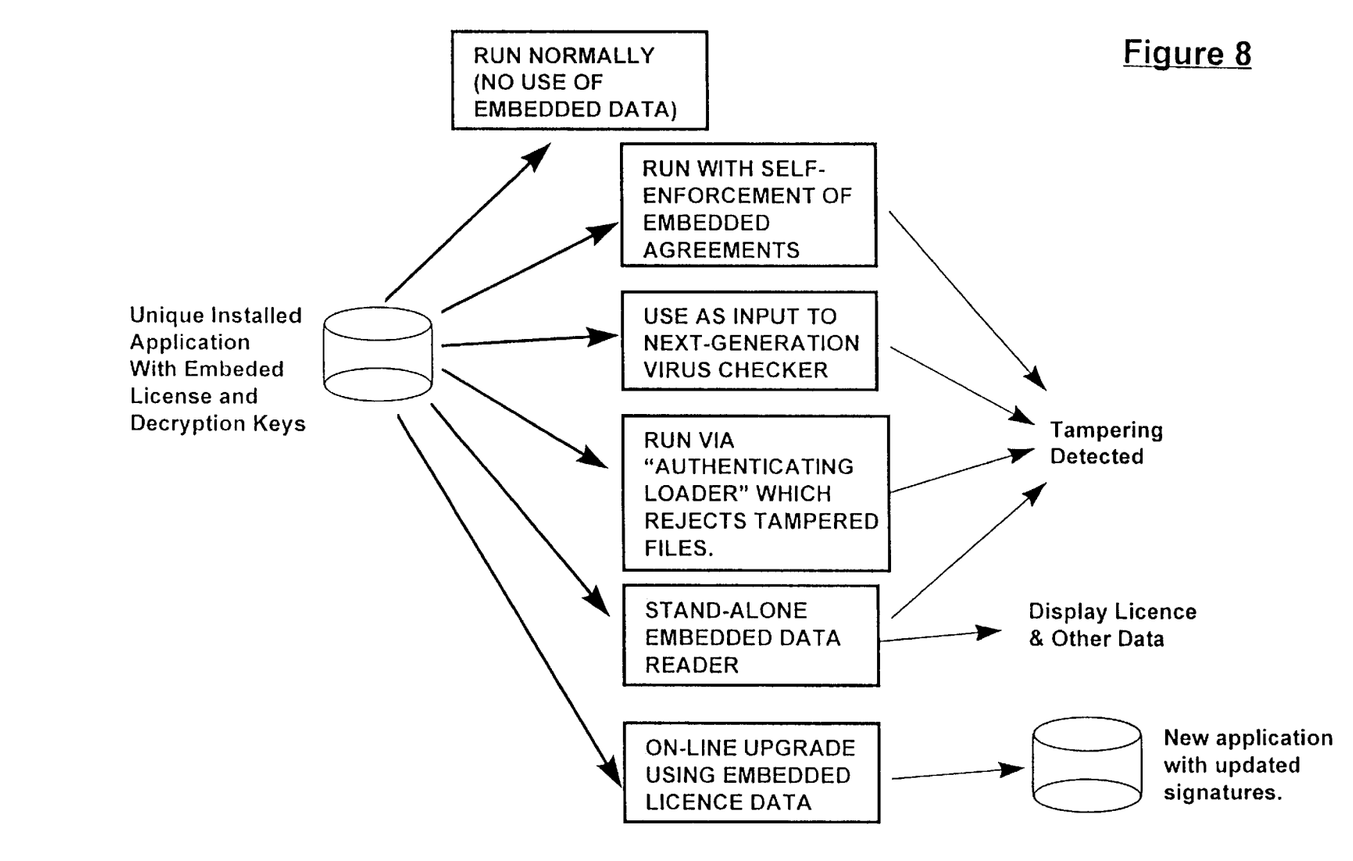

Although the present invention has been described with reference to the preferred embodiments, one of ordinary skill in the art will recognize that a number of variations, alterations and modifications are possible. In FIG. 8 there is an illustration showing the various uses of the installed aggregate distribution file 15. After installation and authentication by the UIA 200, the installed aggregate distribution file 15 may run normally without making use of the embedded data 171 in any way. To ensure licence compliance, the installed aggregate distribution file 15 may also be run in association with a license-enforcement program that verifies that any license terms comprising part of the embedded data 171 are being complied with. The embedded data 171 and cryptographic signatures 172, 174, 175, 176 (depending on the manner in which the aggregate distribution file 170 was constructed) may also be used as an input to a virus checker that may perform an integrity check on the installed aggregate distribution file 15 by using the public key 152 and the same known cryptographic signature algorithm as was employed by the SDA 100. Each time the installed aggregate distribution file 15 is run, the authentication and reading program 400 shown in FIG. 5 may also be run, either by itself, or in association with an authenticating loader that would reject tampered files, and would not permit a tampered installed aggregate distribution file 15 to be run. The embedded data 171 may also be used simply for display to the user.

The method and system disclosed herein can also be used to upgrade an installed aggregate distribution file 15 present on an installation computer. In this case, the UIA 200 and the SDA 100 would verify of the license status of the installed aggregate distribution file 15 present on the installation computer, and then invoke the method and system disclosed herein to construct, deliver and install an upgraded version of the installed aggregate distribution file 15 to the installation computer. The capability to invoke the upgrading feature of the present invention could be done at the request of the user, or it could be invoked automatically upon detection by the UIA 200 of the availability of a new version of the original distribution file 130.

The uniqueness of the installed aggregate distribution file 15 can be used to restrict its operation to a specific central processing unit (CPU) on the installation computer. The identification of the CPU for these purposes would be done by the UIA 200 during the stage of gathering data 32, 34 for transmission to the SDA 100.

The SDA 100 and UIA 200 disclosed herein are not restricted to being invoked at the time of installation or upgrading of the installed distribution file 170. For example, in a computer game environment, the SDA 100 and UIA 200 could be invoked when the user reaches a certain point in the game, giving the user the option to purchase additional functionalities or levels for the game.

This disclosure does not presuppose that the UIA 200 does not possess added intelligence to increase the functionality of the present invention. For example, the UIA 200 may possess the intelligence to find and recognize separate Personal Digital Certificates on the installation computer which establish his identity for purposes sufficient to authorize all, or part of, the transaction in question. Such Personal Digital Certificates and their method of application would conform to established standards such as those used by commercial certificate provider Verisign™ Inc. In addition, the UIA 200 could possess the intelligence to find and recognize digital "coupon" certificates which establish that the user has some specific privilege, such as an entitlement to a specific price for a piece of software, or one which establishes his membership in a specific group, such as a company. In addition, the UIA 200 could locate pre-existing files installed according to the method of the present invention, and examine the embedded data 171. If the UIA 200 determines that there is license information present which may affect the terms of the transaction, or which may indicate a user's likely interest in, for example, an upgrade, the UIA 200 can transmit this information to the SDA 100 so that it can suitably mediate the transaction, advertise an upgrade, etc. A typical example of this would be examining a word-processing application installed in accordance with the present invention to determine that the user is entitled to a free upgrade, which the present invention can then proceed to install.

In another set of variations of the invention, the installed aggregate distribution file 15 is one which uses the principles of Nortel Algorithmic Authorization (NAA), as disclosed in U.S. patent application Ser. No. 08/674,037 filed Jul. 1, 1996, to add robust self-policing of its own integrity. In a first variation, the run-time NAA algorithms, which already have the capability of using the installed aggregate distribution file's 15 own code as an input required for proper operation, and thus of forcing catastrophic failure in the event of tampering, have the scope of this input expanded to include an in-memory copy of one or more of the data items added by the SDA 100, such as the overall cryptographic signature 176.

In a second variation, the "launch stub" component could go further, extracting and decoding the embedded data 171 in the installed aggregate distribution file 15, and comparing the license terms therein (e.g. a specific CPU identified by, say, a certain physical Media Access Control address on a network card) to those it found by examining its current environment. In accordance with the principles of Nortel Algorithmic Authorization, the "launch stub" would not have to "decide" whether to proceed, since such decision-points are obvious attack points for 'hackers' wishing to defeat security mechanisms. Rather, it could modify data upon which proper program operation depended, in such a way that the program would continue to run properly only if said data corresponded to the proper environment per the license. As for the first variation, the application would have been pre-constructed for the specific instance, as per the patent-pending technology, in such a way that its proper flow of control used input data that was initially 'incorrect' in just such a way as to be 'corrected' only by application of the correct license data, or a simple derivative thereof.

The invention disclosed herein does not necessarily alter the functionality of the installed form of the installed aggregate distribution file 15, it only adds information and authenticability to it. However, there are a number of means by which the behaviour of the installed aggregate distribution file 15 can be mediated in new ways enabled by this invention. In one variation, the SDA 100 would have access to a variety of executable forms for a given program, or to software routines which would dynamically construct variant forms, in order to produce a program which meets particular customer function/cost requirements, and/or which actively binds itself to very specific license terms. For example, in the Microsoft Windows™ environment, different behaviour could be embodied by different Dynamic Link Libraries (DLLS) which could be selectively included.

In another variation, the initial executable form of the program file would have specific functional and license-binding choices built-in, and the SDA 100 would inject (possibly authenticable) data into the executable file which caused it to exhibit the desired behaviour. In yet another variation, the SDA 100 could make use of routines with detailed knowledge of specific program structures in order to add variant code to a pre-existing executable program which was not explicitly designed to accommodate such variation.

The described embodiments of the present invention focus on a single "core" file of a specific file type as the cornerstone of a software application's installation and security. However the method of the present invention may certainly be applied to more than one file or file type in a particular case. For example, all of the static files associated with an installed software application could receive embedded information such that they were all authenticable and associable with the particular application and installation instance.

We claim:

1. A method for the electronic distribution of a software application from a distribution computer to an installation computer comprising the steps of:

a. receiving at said distribution computer identifying information uniquely identifying said installation computer;

b. embedding said identifying information in said software application at said distribution computer, said identifying information functioning upon execution of the software application to restrict execution to said installation computer;

c. generating a cryptographic signature for said software application;

d. embedding said cryptographic signature in said software application; and e. transferring said software application including said cryptographic signature from said distribution computer to said installation computer.

2. The method of claim 1, wherein the step of generating a cryptographic signature for said software application includes the steps of a. applying a one-way hash function "hf" to the software application "ed" producing a hash result "edh", where edh=hf(ed); and b. encrypting the hash result "edh" using a cryptographic key to obtain a cryptographic signature.

3. The method of claim 2, wherein the one-way hash function is generated using any one of a Message Digest 5 (MD5) algorithm and a Secure Hash Algorithm (SHA) algorithm.

4. The method of claim 2, wherein the step of encrypting the hash result "edh" includes the step of using a public/private encryption function "ppef" and a private encryption key "prk" to encrypt the hash result "edh" to produce a cryptographic signature "edf" where edf=ppef(prk, edh).

5. The method of claim 4, wherein the public/private encryption function "ppef" is generated using any one of an RSA algorithm, a Rabin algorithm and an ElGamal algorithm.

6. The method of claim 1, wherein the distribution computer and the installation computer are connected by the Internet.

7. The method of claim 1, wherein the identifying information received at said distribution computer is transmitted from said installation computer.

8. The method of claim 1 further comprising the step of:

f. installing said software application at said installation computer.

9. A method of receiving electronically at an installation computer a software application distributed from a distribution computer comprising the steps of:

a. receiving a software application from the distribution computer having embedded therein identifying information uniquely identifying said installation computer, said identifying information functioning upon execution of the software application to restrict execution to said installation computer and a cryptographic signature for said software application; and b. installing the software application at the installation computer.

10. The method of claim 9, wherein prior to the step of receiving the software application from the distribution computer, the installation computer transmits the identifying information to the distribution computer.

11. The method of claim 9, wherein prior to the step of installing the software application, the installation computer authenticates the integrity of the software application.

12. The method of claim 11, wherein the installation computer uses the cryptographic signature to authenticate the integrity of the software application.

13. A software distribution computer for distributing a software application to an installation computer comprising:

a. a storage device for storing a software application for distribution;

b. a communications interface in communication with a communications link, for receiving identification data uniquely identifying said installation computer from said installation computer, and for transferring said software application to said installation computer;

c. means for embedding said identification data in said software application, said identification data functioning upon execution of the software application to restrict execution to said installation computer;

d. means for generating a cryptographic signature for said software application; and e. means for embedding said cryptographic signature in said software application.

14. A software installation computer for receiving a software application distributed by a distribution computer:

a. a storage device for storing identification data uniquely identifying said installation computer, and for storing an installed software application;

b. a computer communications interface in communication with a communications link, for transferring said identification data, and for receiving said software application, the software application having embedded therein the identification data, said identification data functioning upon execution of the software application to restrict execution to said installation computer and a cryptographic signature of the software application;

c. means for installing said software application on said computer storage device.

15. A software distribution computer for distributing a software application from a distribution computer to an installation computer comprising:

a distribution computer;

an installation computer;

a communications link between said installation computer and distribution computer;

said distribution computer comprising:

a. distribution computer storage device for storing a software application for distribution;

b. a distribution computer communications interface in communication with said link, for transferring said software application to said installation computer and for receiving identification data uniquely identifying said installation computer from said installation computer;

c. means for embedding said identification data received from said installation computer in said software application, said identification data functioning upon execution of the software application to restrict execution to said installation computer;

d. means for generating a cryptographic signature for said software application; and e. means for embedding said cryptographic signature in said software application;

said installation computer comprising:

a. an installation computer storage device for storing said identification data, and for storing an installed software application;

b. an installation computer communications interface in communication with said link, for transferring said identification data to said distribution computer and for receiving said software application from said distribution computer; and, c. means for installing said software application on said installation computer storage device.

16. A method for the electronic distribution of a software application from a distribution computer to an installation computer comprising the steps of:

a. receiving at said distribution computer identifying information uniquely identifying said installation computer;

b. embedding said identifying information in said software application at said distribution computer, said identifying information functioning upon execution of the software application to restrict execution to said installation computer; and c. transferring said software application from said distribution computer to said installation computer.

17. The method of claim 16 further including the step of:

d. installing said software application on said installation computer.

* * * * *